US008297080B2

(12) United States Patent
Xue et al.

(10) Patent No.: US 8,297,080 B2
(45) Date of Patent: Oct. 30, 2012

(54) METHOD FOR PRODUCING HIGH STRENGTH AND LONG COILING LENGTH SINGLE-MODE FIBER FOR SUBMARINE CABLE

(75) Inventors: Jiping Xue, Nantong (CN); Chi Xue, Nantong (CN); Yichun Shen, Nantong (CN); Zhaozhang Zhu, Nantong (CN); Qunshan Xue, Nantong (CN); Weixing Zhuang, Nantong (CN); Shanshan Cao, Nantong (CN); Yali Chen, Nantong (CN); Ming Liu, Nantong (CN)

(73) Assignee: Zhongtian Technology Fibre Optics Co., Ltd., Nantong (CN)

( * ) Notice: Subject to any disclaimer, the term of this patent is extended or adjusted under 35 U.S.C. 154(b) by 0 days.

(21) Appl. No.: 12/983,255

(22) Filed: Dec. 31, 2010

(65) Prior Publication Data

US 2011/0094268 A1 Apr. 28, 2011

Related U.S. Application Data

(63) Continuation of application No. PCT/CN2010/070573, filed on Feb. 9, 2010.

(30) Foreign Application Priority Data

Apr. 27, 2009 (CN) .......................... 2009 1 0031143

(51) Int. Cl.
*C03B 37/01* (2006.01)

(52) U.S. Cl. ................. 65/402; 65/385; 65/438; 65/504

(58) Field of Classification Search .................... 65/402, 65/42, 377, 378, 384, 432, 435, 429, 374.12, 65/374.15, 385, 438, 504
See application file for complete search history.

(56) References Cited

U.S. PATENT DOCUMENTS

| | | | | |
|---|---|---|---|---|
| 3,933,453 | A * | 1/1976 | Burke et al. | 65/421 |
| 4,390,357 | A * | 6/1983 | Myers et al. | 65/435 |
| 6,012,305 | A * | 1/2000 | Kuwabara et al. | 65/502 |
| 2003/0051511 | A1 * | 3/2003 | Suzuki et al. | 65/402 |
| 2003/0126891 | A1 * | 7/2003 | Suzuki et al. | 65/435 |
| 2003/0140657 | A1 * | 7/2003 | Oswald et al. | 65/391 |
| 2004/0050112 | A1 * | 3/2004 | Bae et al. | 65/424 |
| 2004/0221618 | A1 * | 11/2004 | Gotoh et al. | 65/382 |

FOREIGN PATENT DOCUMENTS

| | | | |
|---|---|---|---|
| CN | 101251619 | * | 4/2008 |
| CN | 101255005 | * | 4/2008 |

OTHER PUBLICATIONS

CN 10023354 (Machine Translation) [online], [retrieved on Nov. 16, 2011], retrieved from Dialog (http://library.dialog.com/).*
CN 101255005 (Machine Translation) [online], [retrieved on Nov. 16, 2011], retrieved from Dialog (http://library.dialog.com/).*

* cited by examiner

*Primary Examiner* — Matthew Daniels
*Assistant Examiner* — Yana Belyaev
(74) *Attorney, Agent, or Firm* — Matthias Scholl P.C.; Matthias Scholl

(57) ABSTRACT

A method for producing a single-mode fiber for submarine cables including washing and flame polishing of a preform, fiber drawing, coating with a first coating layer and curing therein using an UV-curing device, coating with a second coating layer and curing therein using the UV-curing device, fiber selection with a 2% screening strain, and testing the properties of the fiber. The fiber has a high strength and long coiling length exceeding 100 km and the method is easy to practice with low production cost and parameters involved therein are highly controllable.

6 Claims, 2 Drawing Sheets

METHOD FOR PRODUCING HIGH STRENGTH AND LONG COILING LENGTH SINGLE-MODE FIBER FOR SUBMARINE CABLE

CROSS-REFERENCE TO RELATED APPLICATIONS

This application is a continuation of International Patent Application No. PCT/CN2010/070573 with an international filing date of Feb. 9, 2010, designating the United States, now pending, and further claims priority benefits to Chinese Patent Application No. 200910031143.8 filed Apr. 27, 2009. The contents of all of the aforementioned applications, including any intervening amendments thereto, are incorporated herein by reference.

BACKGROUND OF THE INVENTION

1. Field of the Invention

The invention relates to a method for producing a single-mode fiber, and more particularly to a method for producing a high strength and long coiling length single-mode fiber for submarine cable.

2. Description of the Related Art

Submarine cables work in a specific environment and the laying and maintenance thereof or accidental tension easily causes the destruction of fibers contained therein. Thus, fibers for submarine cables need higher strength in contrast with conventional fibers. Furthermore, to reduce the number of joints, the coiling length of the fibers should accord with the repeater spacing as possibly. The screening strain for conventional single-mode fibers for submarine cables is about 1%, which means a low strength, and the coiling length of conventional single-mode fibers for submarine cables is about 25 km, which means a large number of joints and high signal loss. To improve the service life and transmission efficiency of submarine cables, the strength and coiling length thereof need to be enhanced.

SUMMARY OF THE INVENTION

In view of the above-described problems, it is one objective of the invention to provide a method for producing a single-mode fiber for submarine cables that features a high strength and long coiling length.

The single-mode fiber has higher strength than conventional non-dispersion-shifted fiber G.652 (ITU-T international standard), with a screening strain about 2%, which is twice that of the fiber G.652. Furthermore, the fiber has a coiling length exceeding 100 km, i.e., long coiling length, and can satisfy all the optical properties.

To achieve the above objective, in accordance with one embodiment of the invention, there is provided a method for producing a single-mode fiber for submarine cables that features a high strength and long coiling length, the method comprises the steps of:

a) washing a preform using a mixed solution comprising nitric acid and hydrofluoric acid with a weight ratio thereof of 1:2-8 and an acid concentration of the mixed solution being 30-80%, and treating the preform using flame polishing to remove 10-100 μm silica from the surface thereof;

b) fixing the preform on a fiber drawing furnace comprising a graphite heating element and a stainless steel furnace, an ash content of the graphite heating element being less than or equal to 20 ppm and a surface roughness thereof being less than or equal to 6.3, above the graphite heating element disposed an upper, a middle, and a lower gas inlet pipe, and gas moving therein in the form of laminar flow; drawing the preform at a temperature of 2,000-2,300° C., with a gas flowrate of 10-50 L/min and a speed fluctuation of less than 20 m/min; cooling a resultant bare fiber, coating with a first coating layer and curing therein using an UV-curing device, coating with a second coating layer and curing therein using the UV-curing device, sine twisting the fiber using a sine-twisting wheel, and taking up the fiber using a double take-up system;

c) collecting the fiber produced by the middle of the preform and selecting with a screening strain of 2% (according to ITU-T standards, 1% screening strain is equivalent to 0.69 GPa screening stress);

d) testing the properties of the fiber using a fiber testing instrument (for example, PK2400, PK2200, OTDR, PK2800), a zero dispersion wavelength thereof being 1,300-1,324 nm, a zero dispersion slope being less than or equal to 0.092 ps/($nm^2$ km), a cable cutoff wavelength being less than or equal to 1,260 nm, a mode field diameter being 9.2±0.4 μm, an attenuation at 1,310 nm being less than or equal to 0.35 dB/km, and an attenuation at 1,550 nm being less than or equal to 0.21 dB/km.

In a class of this embodiment, in the step a), hydrogen in an oxyhydrogen flame of the flame polishing reacts with silica under high temperature and as reaction products evaporable silicon monoxide and water are produced and taken away by high-speed oxyhydrogen flame current, thereby repairing microcracks and removing impurities on the surface of the preform.

In a class of this embodiment, in the step b), the gas is an inert gas and performed with a secondary filter prior to entering the fiber drawing furnace and moves in the upper, middle, and lower gas inlet pipes in the form of laminar flow, so that granules generated from the graphite heating element are carried away or attached to a lower inner wall of the fiber drawing furnace under the blowing of the gas flow without contacting the molten glass and the fiber, and the gas flow doesn't blow directly the glass molten zone and fiber generation zone, thereby greatly improving the stability and uniformity of a bare fiber and benefiting the reduction of polarization mode dispersion (PMD) in the subsequent process.

In a class of this embodiment, in the step b), during coating, a high efficiency air filter is employed to ensure the clean conditions and granules in the air are monitored periodically, the granule content in the air reaching one hundred-grade purification effect.

The properties of the fiber of the invention satisfy and are superior to national telecommunications industry standards G.652. The G.652 standards are as follows: an attenuation at 1,310 nm is less than or equal to 0.36 dB/km and at 1,550 nm less than or equal to 0.22 dB/km, a zero dispersion wavelength is 1,300-1,324 nm, a zero dispersion slope is less than or equal to 0.093 ps/(nm2 km), a cable cutoff wavelength is less than or equal to 1,260 nm, and a mode field diameter is 8.6-9.5±0.7 μm.

The fiber has a long coiling length, but the dynamic range tested by the testing instrument is small. According to the test principle, subsection test is applied and the average is calculated to represent the parameters of the fiber.

Advantages of the invention are summarized below. The method comprises two steps of pretreatment, optimizes the gas flow in the graphite heating element, and controls the parameters of the graphite heating element. The screening strain of the fiber is 2%. Thus, the obtained fiber has high strength and a coiling length exceeding 100 km. Other properties of the fiber also satisfy the requirement for producing a submarine cable. Meanwhile, the method is easy to practice with low production cost and parameters involved therein are highly controllable.

BRIEF DESCRIPTION OF THE DRAWINGS

The invention is described hereinbelow with reference to accompanying drawings, in which.

Figure 1:
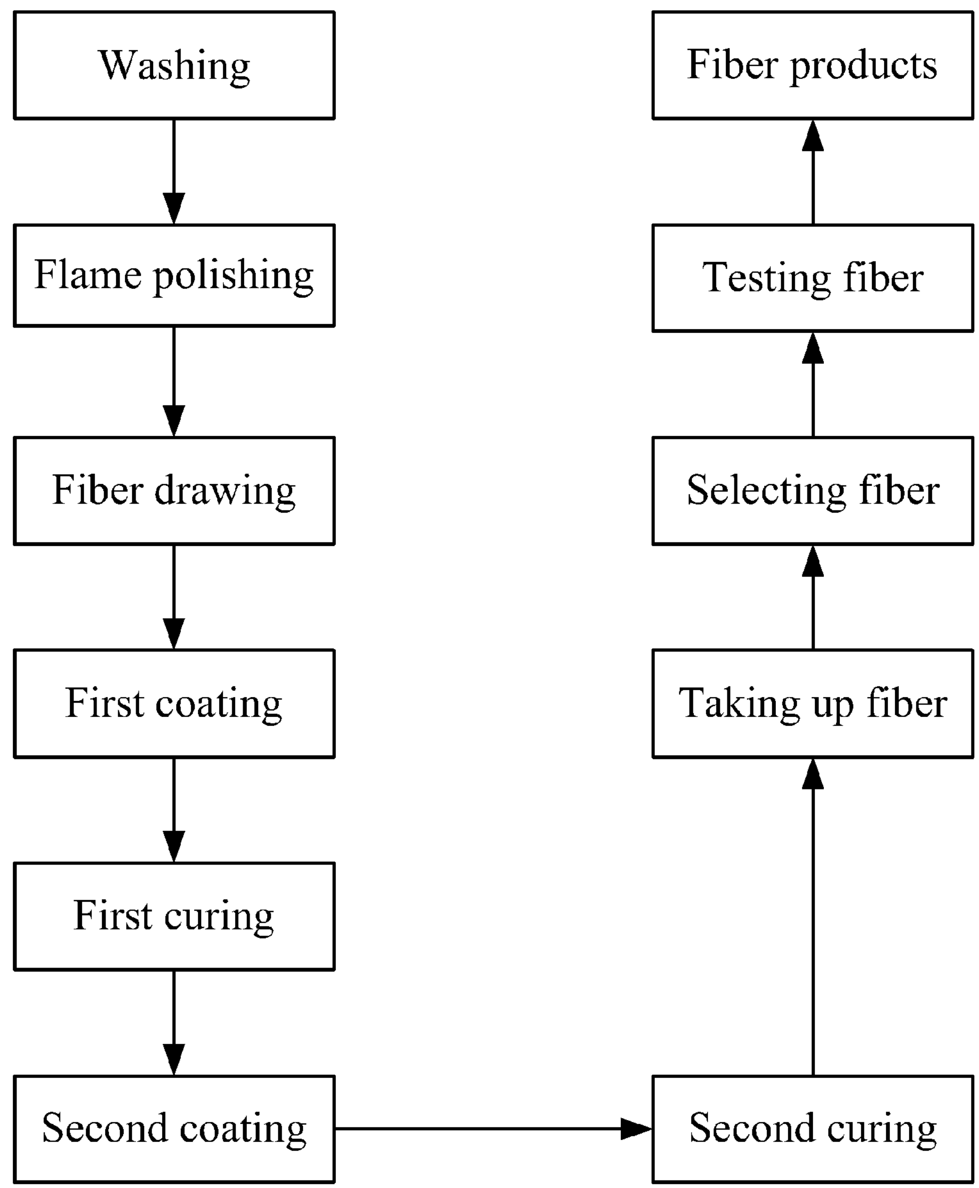
FIG. 1 is a process flow of a method for producing a high strength and long coiling length single-mode fiber for submarine cable according to one embodiment of the invention.

In the drawings, the following reference numbers are used: 1. Core; 2. Inner cladding; 3. Outer cladding; 4. First UV-curing coating; 5. Second UV-curing coating.

DETAILED DESCRIPTION OF THE EMBODIMENTS

To further illustrate the invention, experiments detailing a method for producing a high strength and long coiling length single-mode fiber for submarine cable are described below. It should be noted that the following examples are intended to describe and not to limit the invention.

Figure 2:
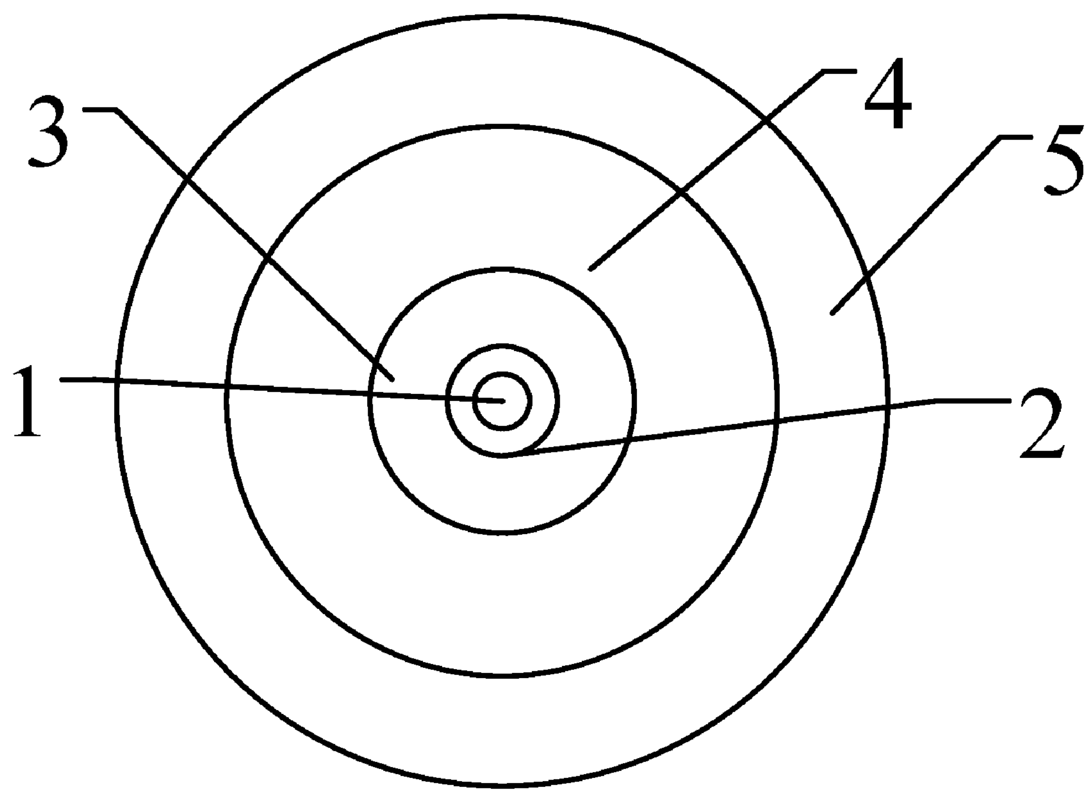
FIG. 2 is a schematic diagram of a high strength and long coiling length single-mode fiber for submarine cable according to one embodiment of the invention.

As shown in FIGS. 1-2, a high strength and long coiling length single-mode fiber for submarine cable comprises a core 1, an inner cladding 2, an outer cladding 3, a first UV-curing coating 4, and a second UV-curing coating 5. The inner cladding 2 and the outer cladding 3 surround the core 1 from inside to outside. The first UV-curing coating 4 and the second UV-curing coating 5 surround the outer cladding 3 from inside to outside. The UV-curing coatings 4, 5 have low modulus and low refractive index. The fiber has a zero dispersion wavelength 1,300-1,324 nm, a zero dispersion slope less than or equal to 0.092 ps/(nm$^2$ km), a cable cutoff wavelength 1,260 nm, a mode field diameter 9.2±0.4 μm, an attenuation at 1,310 nm less than or equal to 0.35 dB/km, and an attenuation at 1,550 nm less than or equal to 0.21 dB/km. These parameters satisfy the national telecommunications industry standards G.652. The G.652 standards are as follows: an attenuation at 1,310 nm is less than or equal to 0.36 dB/km and at 1,550 nm less than or equal to 0.22 dB/km, a zero dispersion wavelength is 1,300-1,324 nm, a zero dispersion slope is less than or equal to 0.093 ps/(nm$^2$ km), a cutoff wavelength is less than or equal to 1,260 nm, and a mode field diameter is 8.6-9.5±0.7 μm. The specific properties of the fiber are that the screening strain of the fiber is 2% and the coiling length of a single coil is up to 100 km.

The fiber is produced following a method comprising the following steps.

1. Pretreatment of the Surface of a Preform

A preform was washed using a mixed solution comprising nitric acid and hydrofluoric acid with a weight ratio of 1:2-8. An acid concentration of the mixed solution was 30-80%.

Subsequently, the preform was treated using flame polishing to remove 10-100 μm silica from the surface thereof. Hydrogen in an oxyhydrogen flame of the flame polishing reacted with silica under high temperature and as reaction products evaporable silicon monoxide and water were produced and taken away by high-speed oxyhydrogen flame current, thereby repairing microcracks and removing impurities on the surface of the preform.

2. Fiber Drawing

The preform was fixed on a fiber drawing furnace comprising a graphite heating element and a stainless steel furnace, an ash content of the graphite heating element being less than or equal to 20 ppm and a surface roughness thereof being less than or equal to 6.3, above the graphite heating element disposed an upper, middle, and lower gas inlet pipes, and gas moving therein in the form of laminar flow. The preform was drawn at a temperature of 2,000-2,300° C., with a gas flowrate of 10-50 L/min and a speed fluctuation of less than 20 m/min. The gas was an inert gas and performed with a secondary filter prior to entering the fiber drawing furnace and moved in the upper, middle, and lower gas inlet pipes in the form of laminar flow, so that granules generated from the graphite heating element were carried away or attached to a lower inner wall of the fiber drawing furnace under the blowing of the gas flow without contacting the molten glass and the fiber, and the gas flow didn't blow directly the glass molten zone and fiber generation zone, thereby greatly improving the stability and uniformity of bare fibers and benefiting the reduction of polarization mode dispersion (PMD) in the subsequent process. The inert gas was argon or a mixture of argon and helium. The secondary filter of the inert gas was performed using a commercial gas filter. Actually, the inert gas was performed with a first filter after being produced.

Subsequently, a resultant bare fiber was cooled, coated with a first coating layer and cured therein using an UV-curing device, coated with a second coating layer and cured therein using the UV-curing device, sine twisted using a sine-twisting wheel, and taken up using a double take-up system. During coating, a high efficiency air filter was employed to ensure the clean conditions and granules in the air were monitored periodically, the granule content in the air reaching one hundred-grade purification effect.

3. Fiber Selection

The fiber produced by the middle of the preform was selected with a screening strain of 2% (according to ITU-T standards, 1% screening strain is equivalent to 0.69 GPa screening stress).

4. Properties Testing of the Fiber

The properties of the fibers were tested using a fiber testing instrument (for example, PK2400, PK2200, OTDR, PK2800), a zero dispersion wavelength thereof being 1,300-1,324 nm, a zero dispersion slope being less than or equal to 0.092 ps/(nm$^2$ km), a cutoff wavelength being less than or equal to 1,260 nm, a mode field diameter being 9.2±0.4 μm, an attenuation at 1,310 nm being less than or equal to 0.35 dB/km, and an attenuation at 1,550 nm being less than or equal to 0.21 dB/km. Thus, the parameters were superior to those of national telecommunications industry standards G.652.

The fiber had a long coiling length, but the dynamic range tested by the testing instrument was small. According to the test principle, subsection test was applied and the average was calculated to represent the measured data of the fiber.

The method modified the process parameters for producing a fiber, for example, pretreating the fiber twice, optimizing the devices for fiber drawing, and improving the screening strain, all of which were easy to practice. Thus, the production cost is low and the fiber obtained has good properties.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing a single-mode fiber for submarine cables comprises the steps of:

a) washing a preform using a mixed solution comprising nitric acid and hydrofluoric acid with a weight ratio thereof of 1:2-8 and an acid concentration of the mixed solution being 30-80%, and treating the preform using flame polishing to remove 10-100 μm silica from the surface thereof;

b) fixing the preform on a fiber drawing furnace comprising a graphite heating element and a stainless steel furnace, an ash content of the graphite heating element being less than or equal to 20 ppm and a surface roughness thereof being less than or equal to 6.3, above the graphite heating element disposed an upper, a middle, and a lower gas inlet pipe, and gas moving therein in the form of laminar flow; drawing the preform at a temperature of 2,000-2,300° C., with a gas flowrate of 10-50 L/min and a speed fluctuation of less than 20 m/min; cooling resultant bare fibers, coating each fiber with a first coating layer and curing therein using an UV-curing device, coating with a second coating layer and curing therein using the UV-curing device, sine twisting the fibers using a sine-twisting wheel, and taking up the fibers using a double take-up system;

c) collecting the fibers produced by the middle of the preform and selecting a fiber with a screening strain of 2%; and d) testing the properties of subsections of each fiber using a fiber testing instrument, and calculating averages of the properties of the subsections to represent parameters of the fiber, a zero dispersion wavelength thereof being 1,300-1,324 nm, a zero dispersion slope being less than or equal to 0.092 ps/($nm^2$ km), a cable cutoff wavelength being less than or equal to 1,260 nm, a mode field diameter being 9.2±0.4 μm, an attenuation at 1,310 nm being less than or equal to 0.35 dB/km, and an attenuation at 1,550 nm being less than or equal to 0.21 dB/km.

2. The method of claim 1, wherein in the step a), hydrogen in an oxyhydrogen flame of the flame polishing reacts with silica under high temperature and as reaction products evaporable silicon monoxide and water are produced and taken away by high-speed oxyhydrogen flame current.

3. The method of claim 1, wherein in the step b), the gas is an inert gas and performed with a secondary filter prior to entering the fiber drawing furnace and moves in the upper, middle, and lower gas inlet pipes in the form of laminar flow.

4. The method of claim 1, wherein during coating, a high efficiency air filter is employed to ensure the clean conditions and granules in the air are monitored, the granule content in the air reaching one hundred-grade purification effect.

5. The method of claim 1, wherein a screening strain of the fiber is 2% and a coiling length of a single coil is up to 100 km.

6. A method for producing a single-mode fiber for submarine cables comprises the steps of:

a) washing a preform using a mixed solution comprising nitric acid and hydrofluoric acid with a weight ratio thereof of 1:2-8 and an acid concentration of the mixed solution being 30-80%, and treating the preform using flame polishing to remove 10-100 pm silica from the surface thereof, wherein hydrogen in an oxyhydrogen flame of the flame polishing reacts with silica under high temperature and as reaction products evaporable silicon monoxide and water are produced and taken away by high-speed oxyhydrogen flame current;

b) fixing the preform on a fiber drawing furnace comprising a graphite heating element and a stainless steel furnace, an ash content of the graphite heating element being less than or equal to 20 ppm and a surface roughness thereof being less than or equal to 6.3, above the graphite heating element disposed an upper, a middle, and a lower gas inlet pipe, and an inert gas which is performed with a secondary filer prior to entering the fiber drawing furnace moving therein in the form of laminar flow; drawing the preform at a temperature of 2,000-2,300° C., with a gas flowrate of 10-50 L/min and a speed fluctuation of less than 20 m/min; cooling resultant bare fibers, coating each fiber with a first coating layer and curing therein using an UV-curing device, coating with a second coating layer and curing therein using the UV-curing device, sine twisting the fibers using a sine-twisting wheel, and taking up the fibers using a double take-up system, wherein during coating, a high efficiency air filter is employed to ensure that the clean conditions and granules in the air are monitored and that the granule content in the air reaches one hundred-grade purification effect;

c) collecting fibers produced-by the middle of the preform and selecting a fiber with a screening strain of 2% and a coiling length up to 100 km; and d) testing the properties of subsections of each fiber using a fiber testing instrument, and calculating averages of the properties of the subsections to represent parameters of the fiber, a zero dispersion wavelength thereof being 1,300-1,324 nm, a zero dispersion slope being less than or equal to 0.092 ps/($nm^2$km), a cable cutoff wavelength being less than or equal to 1,260 nm, a mode field diameter being 9.2±0.4 μm, an attenuation at 1,310 nm being less than or equal to 0.35 dB/km, and an attenuation at 1,550 nm being less than or equal to 0.21 dB/km.

* * * * *